US008027118B2

(12) United States Patent
Ezawa et al.

(10) Patent No.: US 8,027,118 B2
(45) Date of Patent: Sep. 27, 2011

(54) METHOD AND APPARATUS FOR CONTROLLING HEAD WITH SPIN-TORQUE OSCILLATOR IN A DISK DRIVE

(75) Inventors: Toru Ezawa, Hamura (JP); Shuichi Kojima, Akishima (JP); Masahide Kanegae, Tama (JP); Kenichiro Yamada, Tokyo (JP); Katsuhiko Koui, Yokohama (JP); Masayuki Takagishi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/843,723

(22) Filed: Jul. 26, 2010

(65) Prior Publication Data

US 2011/0128648 A1 Jun. 2, 2011

(30) Foreign Application Priority Data

Nov. 27, 2009 (JP) ................................ 2009-270601

(51) Int. Cl.
*G11B 21/02* (2006.01)

(52) U.S. Cl. ............ 360/75; 360/51; 360/55; 360/77.02

(58) Field of Classification Search ........................ None
See application file for complete search history.

(56) References Cited

U.S. PATENT DOCUMENTS

| | | | | |
|---|---|---|---|---|
| 6,011,664 | A | 1/2000 | Kryder et al. | |
| 6,785,092 | B2 * | 8/2004 | Covington et al. | 360/125.45 |
| 7,791,829 | B2 * | 9/2010 | Takeo et al. | 360/55 |
| 2005/0023938 | A1 | 2/2005 | Sato et al. | |
| 2005/0219771 | A1 | 10/2005 | Sato et al. | |
| 2008/0112087 | A1 | 5/2008 | Clinton et al. | |
| 2008/0137224 | A1 * | 6/2008 | Gao et al. | 360/55 |
| 2009/0052095 | A1 | 2/2009 | Yamada et al. | |
| 2010/0232053 | A1 * | 9/2010 | Yano et al. | 360/75 |
| 2010/0328799 | A1 * | 12/2010 | Braganca et al. | 360/31 |
| 2011/0038080 | A1 * | 2/2011 | Alex et al. | 360/123.02 |

FOREIGN PATENT DOCUMENTS

| | | |
|---|---|---|
| JP | 2007-310949 | 11/2007 |
| JP | 2008-123669 A | 5/2008 |
| JP | 2009-064499 | 3/2009 |
| JP | 2009-070541 A | 4/2009 |
| JP | 4348389 | 7/2009 |

OTHER PUBLICATIONS

Information Sheet for preparing an Information Disclosure Statement under Rule 1.56, Jul. 26, 2010.

Notice of Reasons for Rejection mailed by Japan Patent Office on May 31, 2011 in the corresponding Japanese patent application No. 2009-270601.

* cited by examiner

*Primary Examiner* — Dismery E Mercedes

(74) *Attorney, Agent, or Firm* — Knobbe, Martens, Olson & Bear LLP

(57) ABSTRACT

According to one embodiment, an apparatus for controlling a head includes a transmitting module and a controller. The transmitting module is configured to transmit a write signal to a magnetic head having a spin torque oscillator at the time of recording data. The controller is configured to supply a drive signal that has a level higher than the ordinary level for a prescribed effective time, to the spin-torque oscillator in response to an input write gate that instructs the recording of data. During a period other than prescribed effective time, the controller supplies a drive signal having the ordinary level to the spin-torque oscillator.

14 Claims, 7 Drawing Sheets

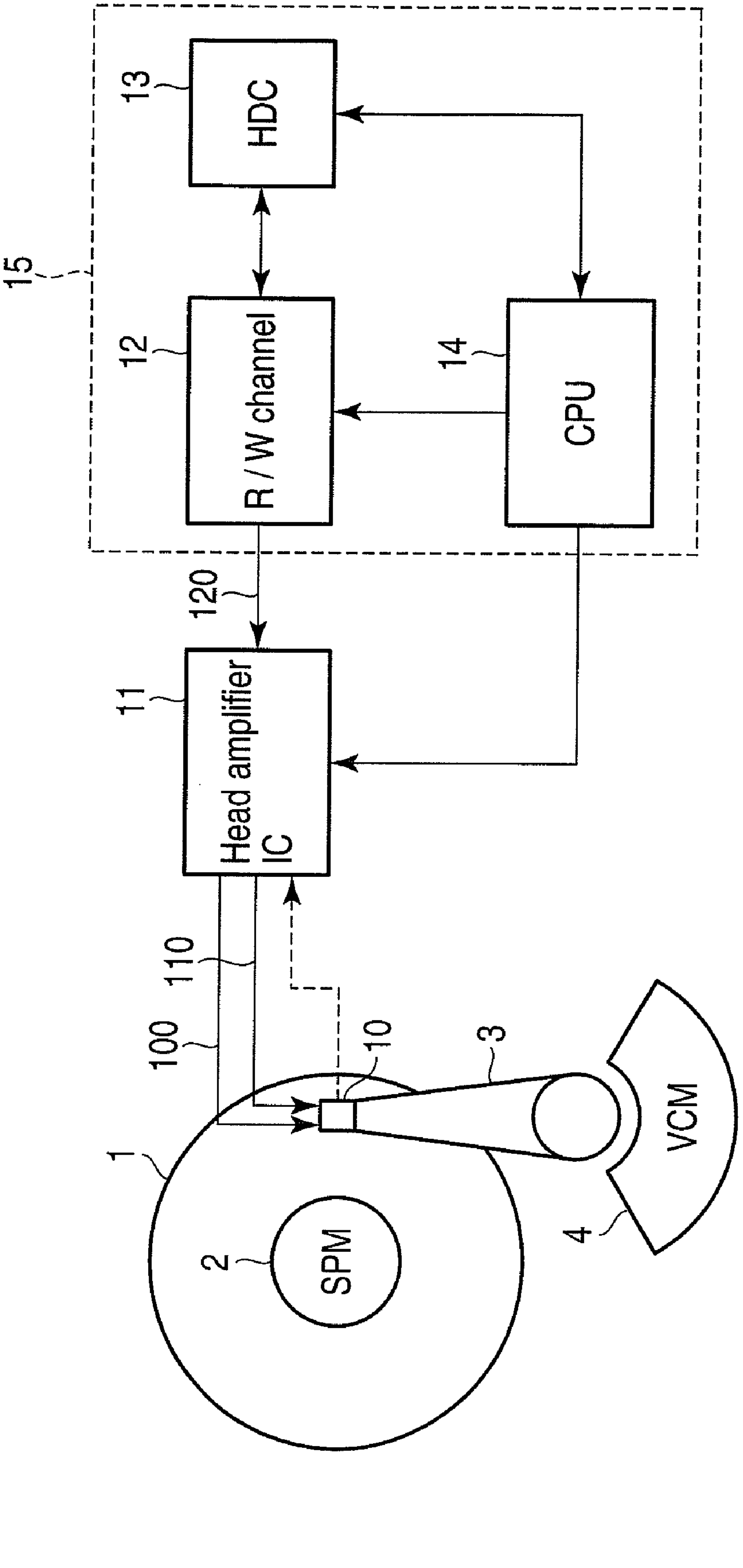
F I G. 1

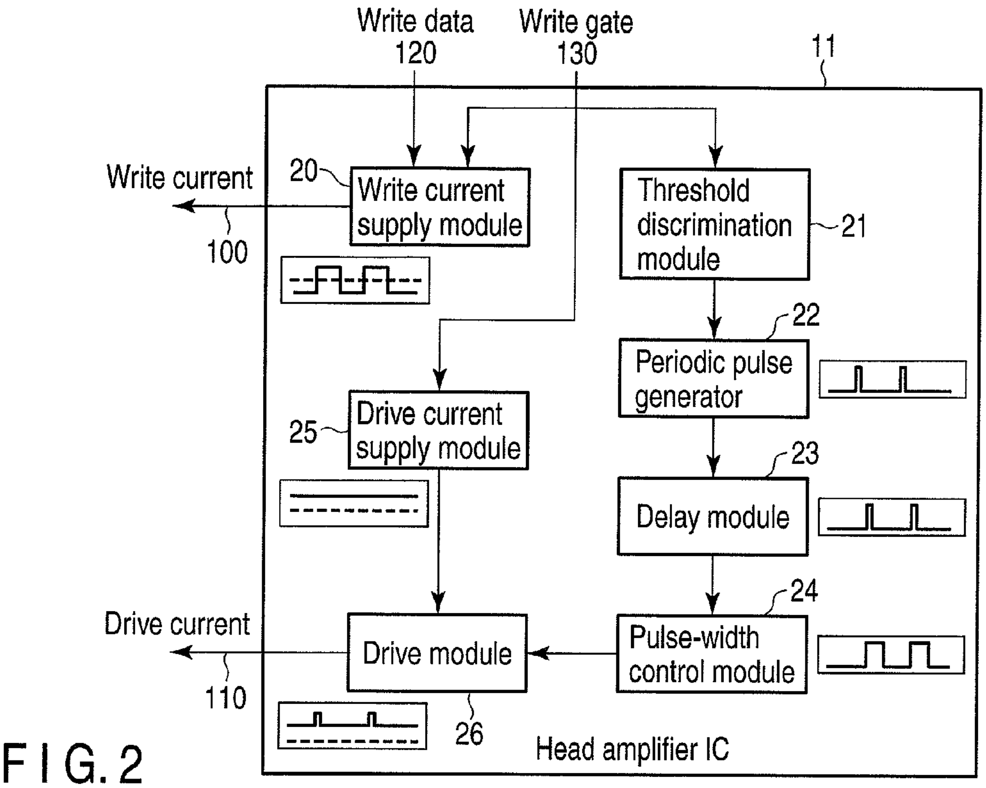
FIG. 2
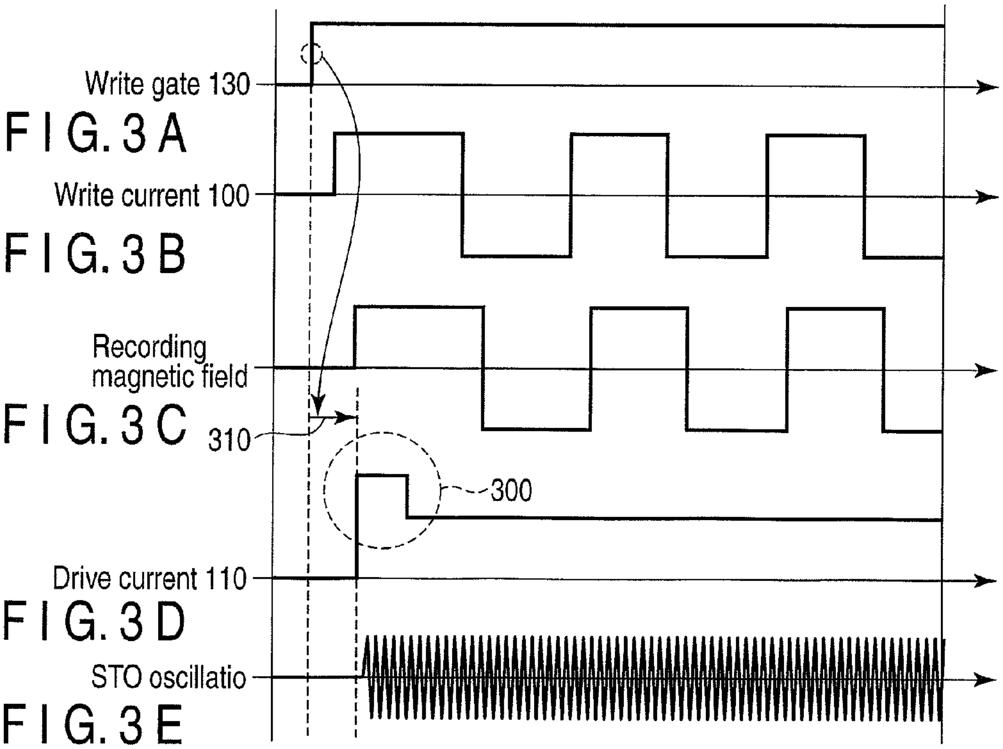
FIG. 3A
FIG. 3B
FIG. 3C
FIG. 3D
FIG. 3E

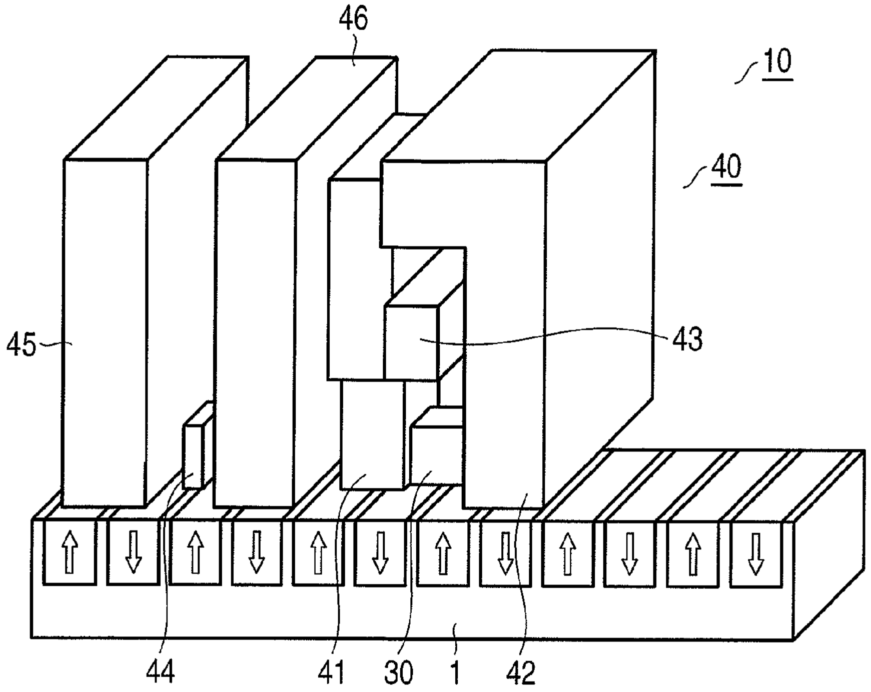
F I G. 4
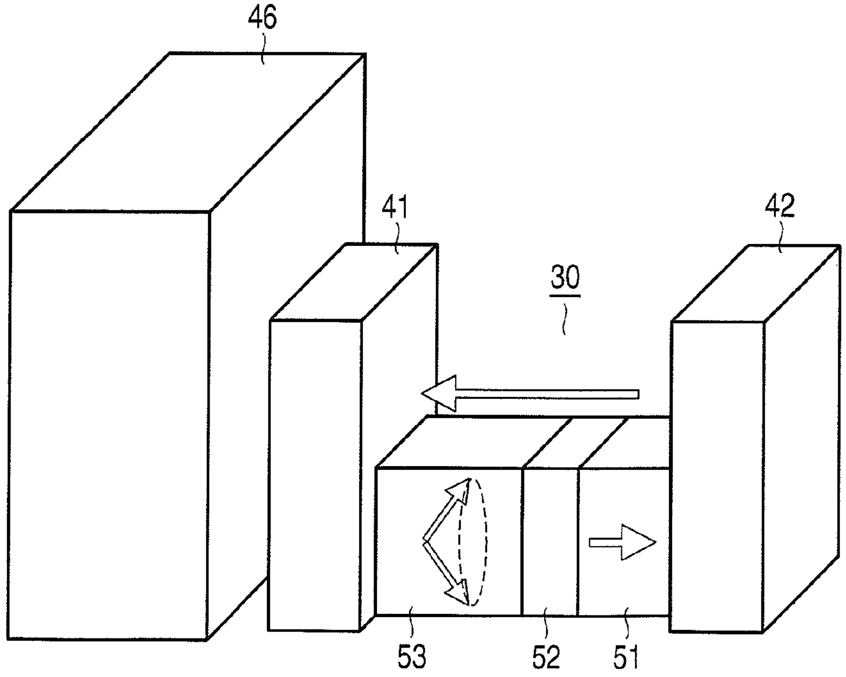
F I G. 5

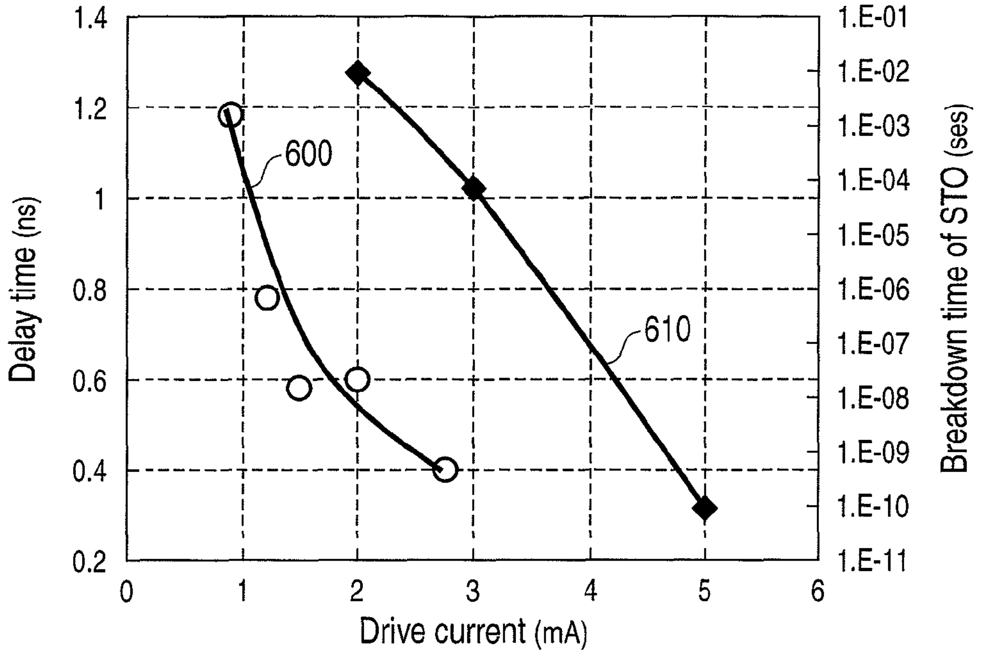
F I G. 6
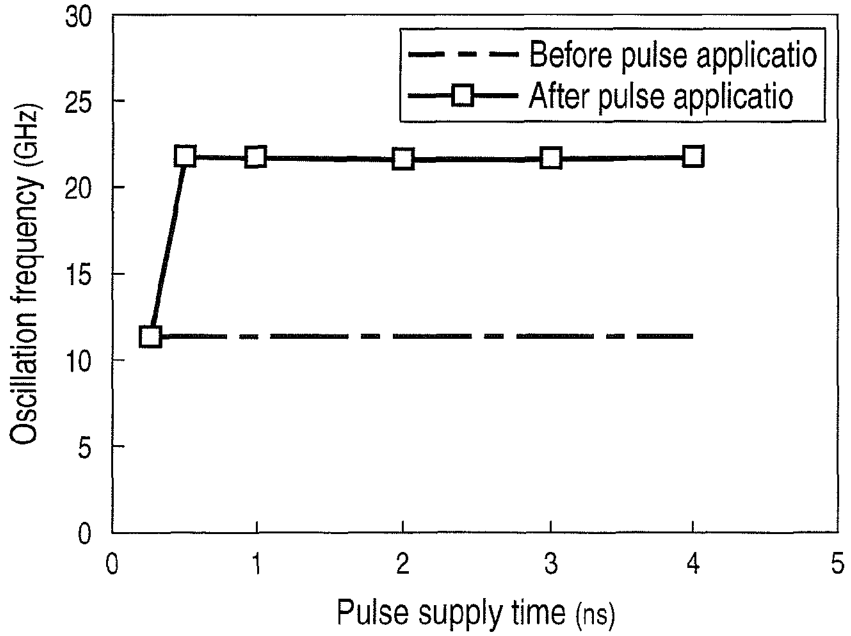
F I G. 7

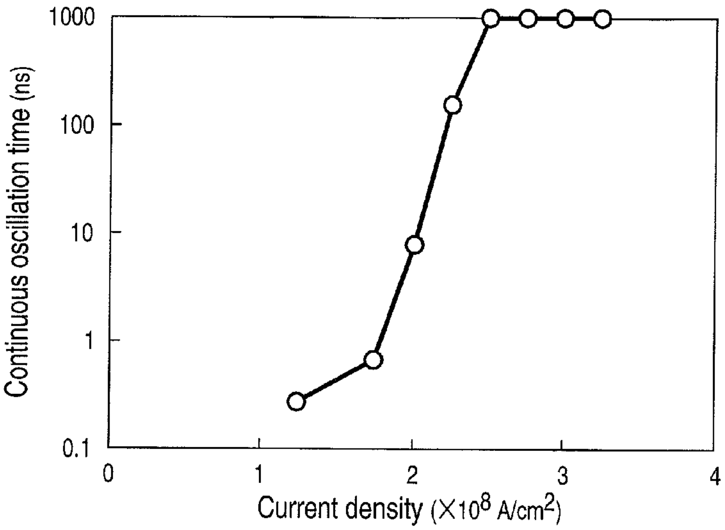
FIG. 8
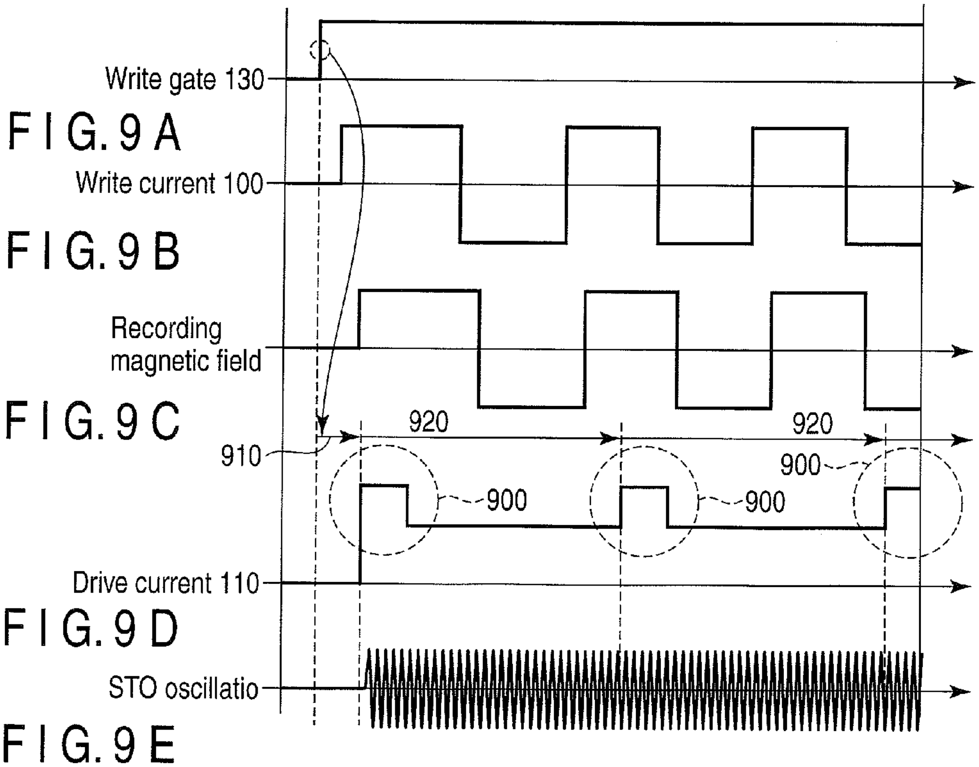
FIG. 9A
FIG. 9B
FIG. 9C
FIG. 9D
FIG. 9E

METHOD AND APPARATUS FOR CONTROLLING HEAD WITH SPIN-TORQUE OSCILLATOR IN A DISK DRIVE

CROSS-REFERENCE TO RELATED APPLICATIONS

This application is based upon and claims the benefit of priority from Japanese Patent Application No. 2009-270601, filed Nov. 27, 2009; the entire contents of which are incorporated herein by reference.

FIELD

Embodiments described herein relate generally to a technique of controlling a magnetic head that has a spin-torque oscillator.

BACKGROUND

In recent years, high-density data recording is promoted and large storage capacity is achieved in the field of disk drives, a representative example of which is the hard disk drive, owing to the development of magnetic heads of giant magneto-resistive effect (GMR) type and the development of perpendicular magnetic recording systems. Along with this technical development, the microwave assisted recording system which applies a high-frequency magnetic field to magnetic disks, has been proposed as a technique of increasing the recording density even more.

The microwave assisted recording system locally applies to a magnetic disk a magnetic field of high frequency much higher than the record signal frequency and near the resonance frequency of the magnetic disk. As a result, the magnetic disk undergoes resonance, decreasing the coercive force (Hc) at the surface of the magnetic disk to half the initial value or a smaller value. Therefore, data can be magnetically recorded on a magnetic disk having a larger coercive force (Hc) and high magnetic anisotropic energy (Ku) if a high-frequency magnetic field is superimposed on the recording magnetic field (see, for example, U.S. Pat. No. 6,011,664). However, the method disclosed in this document can hardly apply a high-frequency magnetic field at high efficiency in order to achieve high-density recording, because the high-frequency magnetic field is generated by a coil in this method.

In view of this, a method has been proposed, which utilizes a spin-torque oscillator (hereinafter referred to as "STO" as needed) as the source of the high-frequency magnetic field (see, for example, U.S. Pat. Appln. Publication No. 2005/0023938 or U.S. Pat. Appln. Publication No. 2005/0219771). The STO has a spin injection layer, an intermediate layer, an oscillation layer, and an electrode. In the technique disclosed in this document, a direct current is supplied through the electrode to the STO, whereby the spin injection layer generates a spin torque. The spin torque magnetizes the oscillation layer, which undergoes ferromagnetic resonance. As a result, the STO generates a high-frequency magnetic field.

The high-frequency magnetic field thus generated locally exists near the STO. Further, the magnetic disk perpendicularly magnetized can effectively undergo resonance by virtue of the in-plane component of the high-frequency field. The coercive force of the magnetic disk can therefore be greatly reduced. As a result, high-density, magnetic recording is performed, only at a part where the recording magnetic field generated by the main magnetic pole of the write head of the magnetic head is superimposed on the high-frequency magnetic field generate by the STO. A magnetic disk having both large coercive force (Hc) and high magnetic anisotropic energy (Ku) may be therefore utilized, thereby to avoid the problem of thermal fluctuation.

The drive current hitherto supplied to the STO is a direct-current signal of ordinary level. The STO has a delay time (oscillation delay time) that elapses until the STO starts oscillation after the write current corresponding to the data to be written on the magnetic disk has been inverted. The data transfer rate of the disk drive therefore increases. Hence, the STO cannot appropriately oscillate in some cases if the write current undergoes magnetization inversion at intervals shorter than the oscillation delay time of the STO. Consequently, the possibility of recording errors on the magnetic disk increases.

In such a case, a drive method in which a pulse signal component is superimposed on the direct ordinary-level drive current works well to shorten the polarity inversion time of the STO. If the drive current is increased very time the write data is inverted, however, the time the STO 30 is kept driven until it is broken will be short, inevitably resulting in a problem with the reliability of the STO.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is a block diagram showing the major components of a disk drive according to each embodiment;

FIG. 2 is a block diagram showing the configuration of the head drive amplifier IC of a first embodiment;

FIGS. 3A, 3B, 3C, 3D and 3E are a timing chart explaining the operation of the head amplifier IC of the first embodiment;

FIG. 4 is a diagram explaining the structure of the magnetic head of each embodiment;

FIG. 5 is a diagram explaining the structure of the STO according to each embodiment;

FIG. 6 is a diagram representing the relationship between the drive current and oscillation delay time of the STO according to each embodiment;

FIG. 7 is a diagram showing the relationship the pulse application time for the STO and the continuous oscillation time of the STO in each embodiment;

FIG. 8 is a diagram showing the relationship between the current density and the continuous oscillation time, which is observed in each embodiment;

FIGS. 9A, 9B, 9C, 9D and 9E are a timing chart explaining the operation of the head amplifier IC of the first embodiment;

DETAILED DESCRIPTION

Figure 10:
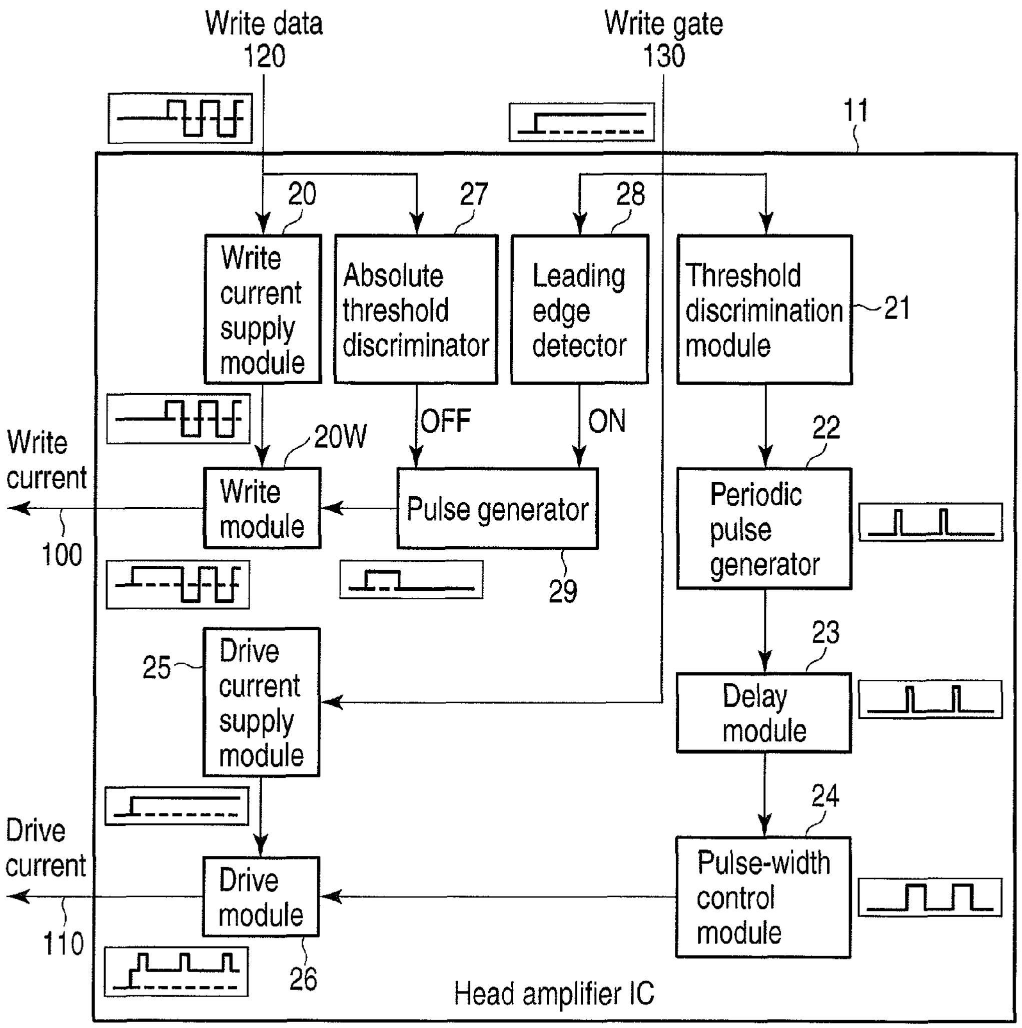
FIG. 10 is a block diagram explaining the configuration of the head amplifier IC of a second embodiment.

Various embodiments will be described hereinafter with reference to the accompanying drawings.

In general, according to one embodiment, an apparatus for controlling a head includes a transmitting module and a controller. The transmitting module is configured to transmit a write signal to a magnetic head having a spin torque oscillator at the time of recording data. The controller is configured to supply a drive signal that has a level higher than the ordinary level for a prescribed effective time, to the spin-torque oscillator in response to an input write gate that instructs the recording of data. During a period other than prescribed effective time, the controller supplies a drive signal having the ordinary level to the spin-torque oscillator.

Embodiments will be described below, with reference to the accompanying drawings.

(Configuration of the Disk Drive)

As shown in FIG. 1, the disk drive according to the embodiment is a disk drive that has a magnetic disk 1 and a magnetic head 10. The magnetic disk 1 is a perpendicular magnetic recording medium. The magnetic head 10 has the function of performing microwave assisted recording. The magnetic disk 1 is secured to a spindle motor (SPM) 2 and can rotate. The magnetic head 10 is mounted on an actuator 3 and configured to move in the radial direction of the magnetic disk 1. The actuator 3 is rotated by a voice coil motor (VCM) 4. The disk drive further has a head amplifier integrated circuit (hereinafter referred to as "head amplifier IC") 11, a read/write channel (R/W channel) 12, a disk controller (HDC) 13, and a microprocessor (CPU) 14. The R/W channel 12, HDC 13 and CPU 14 are incorporated in a one-chip integrated circuit 15.

The head amplifier IC 11 includes an STO drive control device that generates a drive signal (drive current signal or drive voltage signal) 110 for driving a spin torque oscillator (STO), thereby to accomplish microwave assisted recording. The head amplifier IC 11 supplies to the magnetic head 10 a write signal (write current) 100 that corresponds to write data 120 supplied from the R/W channel 12. Further, the head amplifier IC 11 amplifies a read signal output from the magnetic head 10 and then transmits the read signal to the R/W channel 12.

The R/W channel 12 is a signal processing circuit that encodes the write data transferred from the disk controller 13, generating write data 120, and outputs the write data 120 to the head amplifier IC 11. The write data 120 is record data to be recorded on the magnetic disk 1. The R/W channel 12 decodes a read signal (indicated by a broken line), generating read data, and outputs the read data to the disk controller 13.

The disk controller 13 constitute an interface between the disk drive and a host system (not shown, such as a personal computer), and controls the transfer of the read/write data. The disk controller 13 outputs a write gate 130 to the R/W channel 12. The write gate 130 instructs that the writing of write data 120 on the magnetic disk 1 should be started. (Thus, the Write Gate Indicates Write Timing.)

The microprocessor (CPU) 14 is the main control device in the disk drive, and controls the read/write operation and performs servo control required for positioning the magnetic head 10. The CPU 14 sets data (parameters) necessary for the operation of the head amplifier IC 11, in the various registers incorporated in the head amplifier IC 11. The registers hold the write current value, the drive current value (i.e., drive signal level), boost signal current value, boost width, delay time, etc., respectively.

(Configuration of the Head Amplifier Ic)

As shown in FIG. 2, the head amplifier IC 11 of this embodiment has a write current supply module 20 and an STO drive controller. The write current supply module 20 is a driver, which generates, upon receiving the write gate 130 (at the leading edge thereof), a write current 100 corresponding to the write data 120 supplied from the R/W channel 12 and which supplies the write current 100 to the magnetic head 10. The write current supply module 20 includes a register that holds a write current value supplied from the CPU 14, and generates the write current 100 based on the write current value.

The STO drive controller controls the drive voltage signal 110 that is supplied to the STO as drive signal. In the present embodiment, the signal that drives the STO is described as a drive current, but may instead be a voltage value. The STO drive control device has a threshold discrimination module 21, a periodic pulse generator 22, a delay module 23, a pulse-width control module 24, a drive current supply module 25, and a drive module 26. The components 22 to 26 include registers configured to hold the data (parameters) set by the CPU 14.

The threshold discrimination module 21 discriminates the leading edge (i.e., input) of the write gate 130. The periodic pulse generator 22 generates a periodic pulse signal at the leading edge of the write gate 130 discriminated by the threshold discrimination module 21. The delay module 23 delays the pulse signal output from the periodic pulse generator 22 in accordance with the delay time set in the register, in order to supply the pulse at an appropriate timing. The pulse-width control module 24 controls the pulse width of the pulse signal coming from the periodic pulse generator 22, increasing the pulse width by the value corresponding to the boost time (level increase) of the drive voltage signal 110, which will be described later.

The drive current supply module 25 supplies a drive current of an AC ordinary level, at the leading edge of the write gate 130. That is, the drive current supply module 25 generates a drive current (DC component) of the ordinary level set in the register. The drive module 26 superimposes the ordinary-level drive current, supplied from the drive current supply module 25, with a boost drive current raised from the ordinary level by a boost time, thereby generating a drive current 110. The drive module 26 supplies the drive current 110 to the STO included in the magnetic head 10, the dive current 110 having been generated by boosting the ordinary-level drive current in accordance with the boost-signal current value set in the register. At this point, the drive module 26 sets a boost time for the drive current 110, in accordance with the pulse width of the pulse signal output from the pulse-width control module 24. This means that the drive module 26 is a boost module configured to superimpose the pulse signal output from the pulse-width control module 24 on the drive current, thereby amplifying the ordinary-level drive current.

(Structures of the Magnetic Head and Spin Torque Oscillator)

FIG. 4 is a diagram explaining the structure of the magnetic head 10 of the present embodiment. FIG. 5 is a diagram explaining the structure of the spin torque oscillator (STO) 30 incorporated in the magnetic head 10.

The magnetic head 10 is composed mainly of a write head 40 and a read head. The read head and the write head are isolated by an insulator (not shown) made of, for example, alumina. The read head has a magnetic playback element 44 interposed between magnetic shield layers 45 and 46. The magnetic playback element 44 is a GMR element or a tunneling magneto-resistive effect (TMR) element, and is configured to read the data recorded on the magnetic disk 1 by virtue of perpendicular magnetic recording.

The write head 40 has a first electrode 41 and a second electrode 42. The first electrode 41 is the main magnetic pole, and the second electrode 42 is the U-shaped recording magnetic pole that is a return path (shield). The write head 40 further has an excitation coil 43 and an STO 30. The excitation coil 43 is supplied with a write current.

When a write current is supplied to the excitation coil 43, the write head 40 emanates a recording magnetic field from its recording pole, performing perpendicular magnetic recording and thereby recording data on the magnetic disk 1. That is, the write head 40 generates a recording magnetic field at the gap between the first electrode 41 and the second electrode 42. At this point, the recording magnetic field not only acts as a recording magnetic field on the magnetic disk 1, but also is applied to the STO 30. The STO 30 assumes the polarity defined by the magnetic field applied to it, even if the polarity of the drive current 110 remains unchanged.

As shown in FIG. 5, the STO 30 has a spin injection layer 51, an intermediate layer 52 having high spin transmittance, and an oscillation layer 53, which are laid one on another and interposed between the first electrode 41 and second electrode 42. In the STO 30, the drive current 110 flows from the second electrode 42 to the first electrode 41, whereby the oscillation layer 53 generates a high-frequency magnetic field. The high-frequency magnetic field emanating from the STO 30 is applied to the magnetic disk 1. As a result, microwave assisted recording is accomplished.

(Operation of the Head Amplifier IC)

In the disk drive, the write operation, i.e., the process of recording data on the magnetic disk 1, is started at the timing of the write gate 130 output from the HDC 13 as is shown in FIG. 3A. In the head amplifier IC 11, the write current supply module 20 supplies the write current 100 corresponding to the write data 120, to the magnetic head 10 when the write gate 130 is input (that is, at the leading edge thereof) as shown in FIG. 3B. In the magnetic head 10, the write head 40 generates a recording magnetic field from its recoding magnetic pole, with a delay time 310 (FIG. 3D) with respect to the waveform of the write current 100, as is illustrated in FIG. 3C.

On receiving the write gate 130, the threshold discrimination module 21 detects the leading edge of the write gate 130. The periodic pulse generator 22 generates a periodic pulse signal, or pulses at regular time intervals, each every time the threshold discrimination module 21 detects the leading edge of the write gate 130. The delay module 23 performs a control, rendering the pulse signal 300 synchronous with the rise of the recording magnetic field as shown in FIG. 3D. That is, the delay module 23 causes the pulse signal 300 to rise upon elapse of a delay time 310 from the time the write gate 130 rises.

The pulse-width control module 24 controls the pulse width of the pulse signal 300 on such conditions as will be described later, changing the pulse width of the pulse signal 300 to the value that corresponds to a prescribed effective time. The drive current supply module 25 supplies a DC drive current of an ordinary level, with the delay time 310 from the leading edge of the write gate 130. The drive module 26 superimposes the pulse signal output from the pulse-width control module 24 on the drive current having ordinary level and supplied from the drive current supply module 25, generating a drive current 110. The drive current 110 is supplied to the STO 30. When supplied with the drive current 110 while being applied with a recording magnetic field, the STO 30 oscillates, generating a high-frequency magnetic field. That is, the STO 30 starts generating the high-frequency magnetic field upon lapse of the delay time 310 from the input of the write gate 130.

The pulse width of the pulse signal 300 included in the drive current 110 supplied to the STO 30, i.e., the pulse application time, or prescribed effective time, will be explained below.

FIG. 6 is a diagram representing the relationship between the drive current supplied to the STO 30 and the oscillation delay time and the breakdown time (i.e., time the STO 30 is continuously driven until it is broken) have with respect to the drive current supplied to the STO 30. As seen from the relationship 600, the larger the drive current, the longer the oscillation delay time of the STO 30. Hence, the larger the drive current supplied to the STO 30, the more quickly the STO will start oscillating. On the other hand, as seen from the relationship 610, the larger the drive current, the shorter the continuous current-supply time on the logarithmic scale. Therefore, if a high-level drive current is supplied to the STO 30 for a long time, the reliability of the STO 30 will decrease. This is a problem accompanying the practical use of the STO 30.

FIG. 7 is a diagram showing the relationship between the pulse application time and the continuous oscillation time. Here, the ordinary-level drive current has a current density of $2.5\times10^8$ A/cm$^2$, and has a current density of $3.5\times10^8$ A/cm$^2$ at the time of pulse application. Before the pulse application, the oscillation frequency is 11.4 GHz as shown in FIG. 7. Therefore, without pulse application, the oscillation frequency is too low, and the resultant high-frequency magnetic field does not resonate with the magnetic disk 1. Consequently, no stable microwave assisted recording can be accomplished.

This is why the drive current 110 generated by superimposing a pulse signal component (pulse signal 300) on the ordinary-level drive current is supplied to the STO 30 in the head amplifier IC 11 of present embodiment. The pulse signal 300 has a pulse width of 0.5 ns or more. Because of the pulse signal 300, the oscillation frequency changes to 21.8 GHz or more, as shown in FIG. 7. In most cases, the magnetic disk 1 resonates with a high-frequency magnetic field of 20 GHz to 30 GHz. Hence, stable microwave-assisted recording can be achieved once after the pulse has been applied. As a result, the bit error rate will decrease as is desired. That is, the effective time for applying a pulse is at least 0.5 ns.

As shown in FIG. 3D, the drive current 110 superimposed with the pulse signal 300 is supplied to the STO 30 immediately after the write gate 130 has been input. This timing of applying the pulse should better be performed immediately after the inputting of the write gate 130, or in the preamble area prior to the actual data recording. In the disk drive, a sync signal is first written in the preamble area arranged immediately before the data recording area, in order to record the write data in the data recording area (data sector) provide on the magnetic disk 1. Then, the pulse is applied in the preamble area, thereby achieving stable microwave assisted recording in the read recording area, while maintaining the format efficiency of the magnetic disk 1.

If the magnetic disk 1 has storage capacity of 320 gigabytes (GB) and a radius of about 20 mm and can store at the density of 2000 kbpi, it is desirable to set the pulse application time to 12 ns or less. If the pulse application time is 12 ns or less, the decrease in the format efficiency of the magnetic disk 1 will be minimized to make the STO oscillate well in the read recording area.

FIG. 8 is a diagram showing the relationship between the density of the drive current and the continuous oscillation time of the STO 30. As shown in FIG. 8, the continuous oscillation time of the STO 30 is 1000 ns or more if the ordinary-level drive current has a density of $2.5\times10^8$ A/cm$^2$ or more. Therefore, if the ordinary-level drive current is continuously supplied after the drive current 100 having a higher level because of the pulse applied in the preamble area prior to the data recording, the STO 30 will oscillate well in one entire data sector.

If the ordinary-level drive current has a density of 2 to $2.5\times10^8$ A/cm$^2$, the continuous oscillation time will be shorter than the time for recording data in one data sector. The STO 30 inevitably stops oscillating in the data recording area if the pulse is applied in the preamble area only and the ordinary-level drive current is not thereafter supplied continuously. In order to avoid this, the high-level drive current 110, generated by applying the pulse in the preamble area for the prescribed effective time, is first supplied and the ordinary-level drive current is then supplied. The STO 30 can thereby keep oscillating, accomplishing stable microwave-assisted recording in the data recording area.

FIGS. 9A to 9E are a timing chart explaining how the head amplifier IC 11 should operate in a desirable manner in the present embodiment.

As shown in FIG. 9D, the head amplifier IC 11 of this embodiment periodically generates a pulse 900 at the leading edge of the right gate 130, and applies the pulse 900 to the ordinary-level drive current. The oscillation of the STO 30 is thereby refreshed periodically. This achieves more stable oscillation of the STO 30 in the entire data sector.

More specifically, the pulse application time (i.e., prescribed effective time), the pulse interval 910 and the density of the ordinary-level drive current may be set to 1 ns, 9 ns and $2.2\times10^8$ A/cm$^2$, respectively. In this case, the pulse interval must be less than or equal to the continuous oscillation time of the STO 30. Note that the pulse interval 910 shown in FIG. 9D is equivalent to the delay time 310 shown in FIG. 3D.

The pulse application time for the preamble area may be set longer than the pulse application time for the data recording area. In the preamble area, the pulse 900 that lasts relatively long must be applied because the data writing has started immediately before and the oscillation frequency of the STO 30 is still low. By contrast, in the data recording area, the oscillation of the STO 30 can be sufficiently refreshed because the STO 30 has started oscillator long before. Further, the decrease in the reliability of the STO 30 can be minimized by applying the pulse for a comparatively short time.

Immediately after the data writing has started, the oscillation frequency of the STO 30 is not stable. If the write data 120 changes in polarity while the oscillation frequency of the STO 30 remains unstable, the STO 30 may have unexpected troubles. It is therefore desirable to finish supplying the pulse first input after the input of the write gate 130, before the write data 120 is switched in polarity.

As described above, the head amplifier IC 11 of this embodiment can stably oscillate the STO 30 in response to the write gate 130, by applying, to the ordinary-level drive current, the pulses periodically generated immediately after the input of the write gate 130. Moreover, the breakdown of the STO 30 can be suppressed since pulses are applied at regular time intervals, each for the prescribed effective time (i.e., appropriate pulse width), not in synchronism with the polarity inversion of the write data 120. As a result, the reliability of the STO 30 is ensured, and the STO 30 can keep stably oscillating. This helps to accomplish reliable microwave assisted recording.

Second Embodiment

FIGS. 10 and 11A to 11F are diagrams concerning a second embodiment. The disk drive according to this embodiment is identical in configuration to the first embodiment shown in FIG. 1, and will not be described. Those components of the head amplifier IC 11 shown in FIG. 10, which are identical to those of the first embodiment (FIG. 1), are designated by the same reference numbers and will not be described.

As shown in FIG. 10, the head amplifier IC 11 of this embodiment has an absolute threshold discriminator 27, a leading edge detector 28, a pulse generator 29, and a write module 20W, in addition to the modules 20 to 26. How the head amplifier IC 11 of this embodiment operates will be explained with reference to the timing chart of FIGS. 11A to 11F.

In the head amplifier IC 11 of this embodiment, the drive current 110 is supplied from the drive module 26 to the STO 30 in the same way as in the first embodiment.

When the leading edge detector 28 detects the leading edge of the write gate 130, the pulse generator 29 generates a pulse. When the absolute threshold discriminator 27 detects the leading edge of the write data 120, it causes the pulse generator 29 to stop generating the pulse. The pulse generator 29 is thus controlled to generate a pulse only for a period from the leading edge of the write gate 130 to the leading edge of the write data 120.

Figures 11A, 11B, 11C, 11D, 11E, 11F:
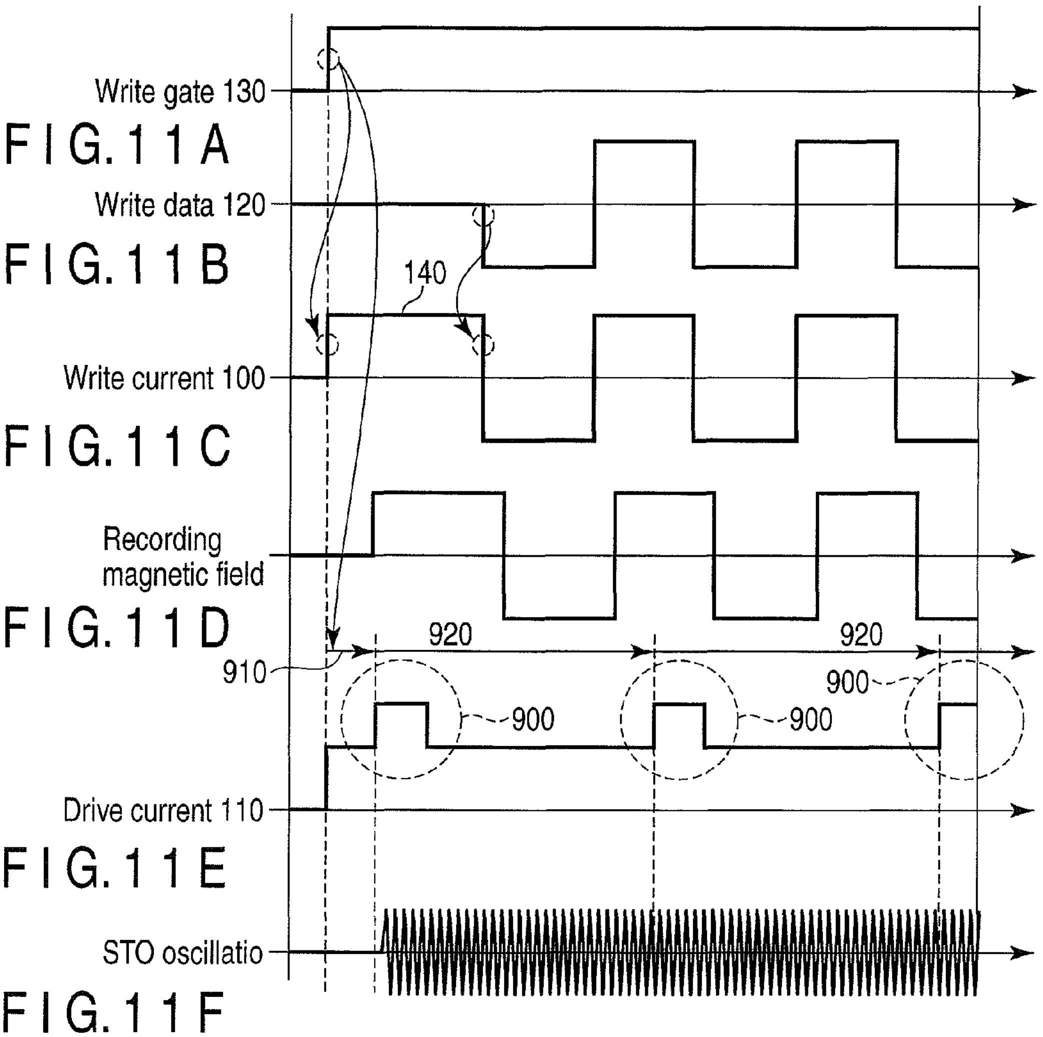
FIGS. 11A, 11B, 11C, 11D, 11E and 11F are a timing chart explaining the operation of the head amplifier IC of the second embodiment.

The write current supply module 20 generates a write current at the leading edge of the write data 120. The write module 20W superimposes the pulse generated from the pulse generator 29 for only a prescribed time, with the write current supplied from the write current supply module 20, generating such a write current 100 as shown in FIG. 11C. The write current 100 is supplied to the write head 40. That is, the write module 20W of this embodiment supplies a write current (pre-write signal) corresponding to so-called dummy data, to the write head 40 during a period from the leading edge of the write gate 130 to the leading edge of the write data 120.

As shown in FIG. 11D, the write head 40 generates a recording magnetic field from the recording magnetic field when a write current 140 is supplied to its coil 43. Thus, the recording magnetic field is applied to the STO 30. The drive current supply module 25 supplies the ordinary-level drive current at the leading edge of the write gate 130. The drive module 26 therefore supplies a high-level drive current 110 superimposed with a pulse 900, to the STO 30, upon lapse of a delay time 910 starting with the leading edge (input point) of the write gate 130.

In this embodiment, the write current (pre-write signal) that corresponds to the dummy data is supplied to the write head 40, whereby the STO 30 stably oscillates with the high-level drive current 110 that is superimposed with the pulse 900 before the data recording. The STO 30 may often fail to oscillate stably immediately after the start of data writing, because its oscillation frequency is low. If this is the case, the pulse must be applied for a relatively long time immediately after the start of data writing. Therefore, in this embodiment, the oscillation is started with the high-level drive current 110 prior to the recording of data, thereby making the STO 30 keep oscillating stably during the data recording.

MODIFICATION

The head amplifier IC 11 of the first and second embodiments has registers that parameters for driving and controlling the STO 30, such as the value of the ordinary-level derive current, the value of the high-level drive current, the regular time intervals, the delay time, and the pulse width.

Assume that a high-level pulse generated at regular time intervals. Then, if the pulse has too large a width, the reliability of the STO 30 will be impaired. Conversely, if the pulse has too small a width, the STO 30 will not attain sufficiently intense oscillation or keep oscillating for a sufficiently long time. Further, if the time intervals are too long, the STO 30 will stop oscillating, failing to work for a sufficiently long time. Conversely, if the time intervals are too short, the reliability of the STO 30 will be impaired. Nonetheless, the pulse can be generated at appropriate time intervals and can have an appropriate width, because the CPU 14 incorporated in the disk drive adjusts the values set in the registers provided in the head amplifier IC 11.

The oscillation state of the STO 30 changes with the element materials, structure, characteristic deviation and ambient temperature of the STO 30. Therefore, the element materials, structure, characteristic deviation and ambient temperature of the STO 30 must be set to optimal ones, in accordance with each head and the use condition thereof, so that microwave assisted recording may be accomplished. To this end, the optimal values for the various parameters of each head are determined and set in the respective registers incorporated in the head amplifier IC 11, before the disk drive is shipped from the manufacturer. Each register may have a table of various values for the parameter. In this case, the parameters, such as the high-level current value, the regular time intervals, the output time of high-level drive current, can be changed in accordance with, for example, the ambient temperature of the disk drive actually used.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An apparatus for controlling a head, comprising:

a transmitter configured to transmit a write signal to a magnetic head comprising a spin-torque oscillator, at the time of recording data;

a controller configured to supply a high-level drive signal comprising a first level higher than a predetermined level, to the spin-torque oscillator for an effective period in response to a write gate input and instructing the recoding of data, and to supply the predetermined level drive signal to the spin-torque oscillator for any time outside of the effective period.

2. The apparatus of claim 1, wherein the controller comprises:

a pulse generator configured to generate the pulse comprising a width corresponding to the effective period, in response to the write gate input;

a drive signal generator configured to generate the predetermined level drive signal in response to the write gate input; and a drive signal supply module configured to supply the high-level drive signal generated by superimposing the pulse on the predetermined level drive signal, to the spin-torque oscillator when or after the write gate is activated, and then to supply the predetermined level drive signal continuously to the spin-torque oscillator.

3. The apparatus of claim 1, wherein the controller is configured to supply high-level drive signals at regular intervals, the first high-level drive signal being supplied for a designated time, and the second high-level drive signal being supplied for the effective period.

4. The apparatus of claim 3, wherein the controller comprises:

a periodical pulse generator configured to generate a pulse periodically in response to the write signal input, the pulse comprising a width corresponding to the effective period;

a drive signal generator configured to generate the predetermined level drive signal in response to the write gate input; and a drive signal supply module configured to supply the high-level drive signal generated by superimposing the pulse periodically generated, on the predetermined level drive signal, to the spin-torque oscillator at the at regular intervals when or after the write gate is activated.

5. The apparatus of claim 1, wherein the controller is configured to supply the high-level drive signal to the spin-torque oscillator for the effective period upon lapse of a predetermined delay time after the write gate is activated.

6. The apparatus of claim 1, wherein the controller is configured to generate a pre-write signal to the magnetic head, after the write gate is activated and before the write data is received at the time of recording data.

7. The apparatus of claim 6, wherein the controller is configured to superimpose the pre-write signal on the write signal from the transmitter and to supply the write signal superimposed with the pre-write signal, to the magnetic head.

8. The apparatus of claim 1, wherein the controller is configured to stop supplying the high-level drive signal, after the write gate is activated and before the write data is switched in polarity.

9. The apparatus of claim 1, wherein the controller is further configured to supply the high-level drive signal to the spin-torque oscillator when a preamble area in the write data operates at the time of recording data.

10. The apparatus of claim 1, further comprising:

a timer configured to set a delay time;

an output module configured to output the high-level drive signal for a predetermined period, upon lapse of the delay time;

a drive signal superimposing module configured to superimpose the high-level drive signal on the predetermined level drive signal; and registers configured to hold the value of the predetermined level drive signal, the value of the high-level drive signal, the delay time, and the predetermined period for outputting the high-level drive signal.

11. The apparatus of claim 3, further comprising:

a first timer configured to set the delay time;

a second timer configured to set the regular intervals;

an output module configured to output the high-level drive signal for a predetermined period upon lapse of the effective period;

a drive signal imposing module configured to superimpose the high-level drive signal on the predetermined level drive signal; and registers configured to hold the value of the predetermined level drive signal, the value of the high-level drive signal, the regular intervals, the delay time, and the predetermined period for outputting the high-level drive signal.

12. The apparatus of claim 6, further comprising:

a register configured to hold the value of the pre-write signal.

13. A disk drive comprising:

the apparatus of claim 1; and a magnetic head comprising the spin-torque oscillator; and a magnetic disk configured to store data by recording with the magnetic head.

14. A method of controlling a head in a disk drive that comprises a magnetic disk and a magnetic head comprising a spin-torque oscillator, the method comprising:

supplying a write signal to the magnetic head; and supplying a high-level drive signal comprising a first level higher than a predetermined level, to the spin-torque oscillator for an effective period in response to a write gate input; instructing the recoding of data; and supplying a predetermined level drive signal to the spin-torque oscillator for any time other than the effective period.

* * * * *